United States Patent
Chen et al.

(10) Patent No.: US 8,305,040 B2
(45) Date of Patent: Nov. 6, 2012

(54) BATTERY CHARGING METHOD

(75) Inventors: Tai-Hung Chen, Hsinchu County (TW); Ming-Ta Chen, Hsinchu County (TW); Kuo-Chang Huang, Hsinchu County (TW); Chih-Jen Fu, Taoyuan County (TW)

(73) Assignee: Simplo Technology Co., Ltd., Hsinchu County (TW)

( * ) Notice: Subject to any disclaimer, the term of this patent is extended or adjusted under 35 U.S.C. 154(b) by 301 days.

(21) Appl. No.: 12/859,522

(22) Filed: Aug. 19, 2010

(65) Prior Publication Data

US 2011/0169459 A1     Jul. 14, 2011

(30) Foreign Application Priority Data

Jan. 8, 2010   (TW) .............................. 99100358 A
Jan. 27, 2010  (TW) .............................. 99102298 A

(51) Int. Cl.
      *H01M 10/44*           (2006.01)
(52) U.S. Cl. ...................................................... 320/132
(58) Field of Classification Search .................. 320/107, 320/127, 128, 132, 149; 324/427, 433
      See application file for complete search history.

(56) References Cited

U.S. PATENT DOCUMENTS

| | | | | |
|---|---|---|---|---|
| 5,412,323 A | * | 5/1995 | Kato et al. | 324/429 |
| 2005/0085277 A1 | * | 4/2005 | Chen et al. | 455/572 |
| 2007/0205745 A1 | * | 9/2007 | Chen et al. | 320/136 |
| 2010/0060238 A1 | * | 3/2010 | Chen et al. | 320/136 |

* cited by examiner

*Primary Examiner* — Edward Tso
(74) *Attorney, Agent, or Firm* — Rosenberg, Klein & Lee

(57) ABSTRACT

A battery charging method is provided for extending life of batteries. The method includes providing an appropriate charge-off voltage with respect to variation in both of a remaining capacity and an idle time of the battery. Further, the charge-off voltage may vary according to the remaining capacity and the idle time of the battery, so as to increase charging efficiency of the battery. Additionally, the present invention also provides adjusting a charge-off current to a value according to the variation in an actual capacity of the battery.

8 Claims, 6 Drawing Sheets

BATTERY CHARGING METHOD

BACKGROUND OF THE INVENTION

1. Field of the Invention

The present invention relates to a battery charging method, and more particularly, to a battery charging method that modifies a charge-off voltage up or down, thereby extending battery service life.

2. Description of Related Art

Because of characteristics associated with the materials of Lithium cells, the Lithium cells generally may not be charged at voltages over 4.2 volts; otherwise the service life of the Lithium cells may be shortened significantly or otherwise compromised. When the Lithium cells are charged at voltage levels that are much higher than 4.2 volts, the lithium cells may be in danger of burning or even blowing up.

Please refer to FIG. 1, in which a curve of a conventional lithium battery in charging is demonstrated. Initially, the lithium cells are charged by applying a constant current (see curve I), and then later charged by a constant voltage (curve V). In the initial constant current charging stage, the battery voltage continuously increases up to a predetermined charge-off voltage Voff, which is the voltage at which the charging is switched off. While the battery voltage reaches the charge-off voltage Voff, the battery charging enters the constant voltage charging stage. When lithium cells are charged in a constant voltage charging stage, the charging current gradually decreases. As the battery current reaches a predetermined charge-off current Ioff, the point at which the current charging phase is ended, the lithium cells are fully charged.

Additionally, another method of conventional battery charging applies on/off switches to modulate charging currents for lithium cells. Yet, the lithium cells may be damaged and the service life thereof may be shortened in the absence of reliable approaches for the switching operation. In addition, the actual switching during charging cycles may be associated with a corresponding energy loss operation. This may result from electrical (voltage, current, etc.) spikes arising in or from the switching operations to further shorten the service life of the lithium cells.

Another conventional battery charging pattern utilizes a number of charging/discharging cycles to downwardly adjust the charge-off voltage. However, if the lithium cells are charged before their battery's charges are exhausted or discharged before being fully charged this type of conventional approach may not achieve the intended or desired goal of downwardly adjusting the charge-off voltage.

In short, the generally available conventional battery-charging methods generally adjust the battery charging depending on the status of the battery cells without considering other characteristics of the battery cells.

SUMMARY OF THE INVENTION

In view of the aforementioned issues, the present invention provides a battery charging method for extending entire life cycles of the batteries. The method provides an appropriate charge-off voltage according to variation in either the remaining capacity or the idle time of the battery. Further, the charge-off voltage varies according to the current state of the battery, which allows for enhancement of the charging efficiency of the battery.

Additionally, the battery charging method provides for not only adjustment of the charge-off voltage according to variation in the remaining capacity and/or the idle time of the battery, but also adjusts the charge-off current to an appropriate value according to the variation in the full charge capacity of the battery.

Therefore, through the previously mentioned technical aspects of this invention, significant benefits including availability of adjustment of the battery charging method through simple modification of the regulation of the actual charging of the battery charging are achieved thereby providing extension of the life cycles of the batteries with lowered manufacturing cost.

DETAILED DESCRIPTION OF THE PREFERRED EMBODIMENTS

According to the present invention, a battery charging method for charging batteries in a constant-current charging mode may determine an appropriate charge-off voltage with respect to a linear or non-linear default regulation based on an idle time, a relative state of remaining capacity (RSOC) or a combination of both. When the battery voltage reaches the charge-off voltage, the battery charging is switched from the constant current charging mode to a constant voltage charging mode. And the method may further determine an appropriate charge-off current based on a full charge capacity (FCC) of the battery. In the constant voltage charging mode, as the charging current reaches the charge-off current the battery is fully charged.

Battery modules illustrated in the following embodiments are lithium battery modules; however, this invention is not limited to lithium battery modules.

Figure 1:
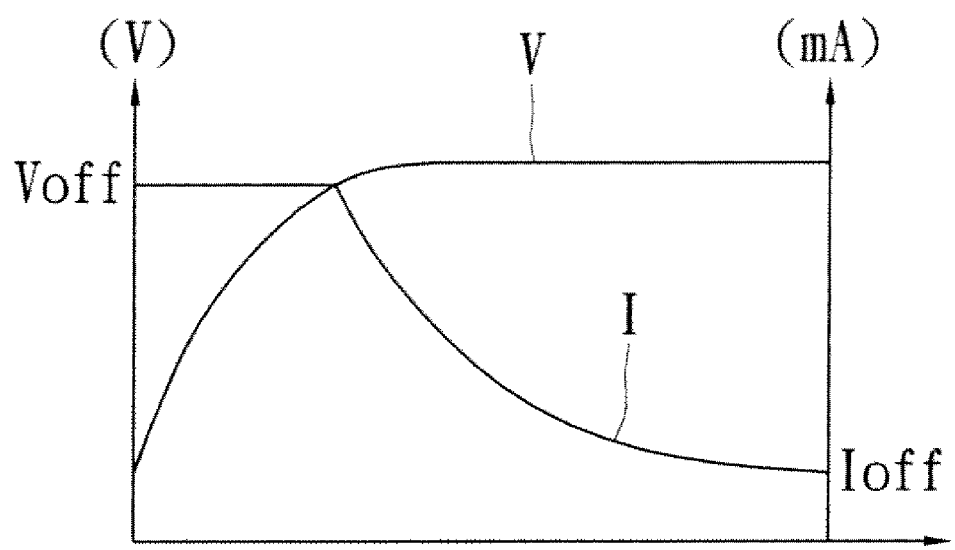
FIG. 1 is a diagram illustrating a curve of a conventional lithium battery during a charging cycle.
Figure 2:
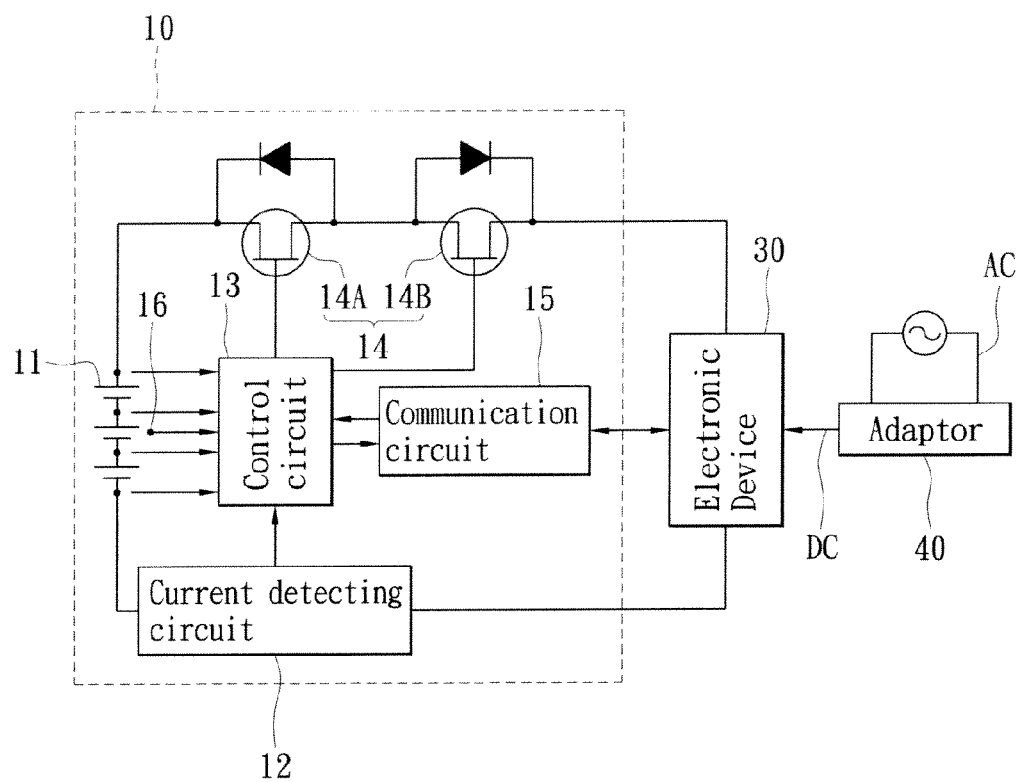
FIG. 2 provides a schematic diagram of a battery module in accordance with the present invention.

Please refer to FIG. 2, which is a schematic diagram of a battery module in accordance with the present invention. A battery module 10 is disposed inside an electronic device 30. The battery module 10 may be charged by the electronic device 30. The above-mentioned electronic device 30 may be a digital camera, a mobile cell phone, a personal digital processor, a notebook or other computer, or other multi media electronic products. The electronic devices 30 may be an electric vehicle or other power-driven products. The battery module 10 is placed inside the electronic device 30 in a detachable and replaceable manner. Yet, the battery module 10 may be internally situated or connected within the electronic device 30 and, therefore, may not be easily removed from the electronic device 30.

When the electronic device 30 is electrically connected to an adapter 40, the adapter 40 may convert an alternating current (AC) power from a public electrical power distribution system (not shown) to a direct current (DC) power so that the DC power could be supplied to the electronic device 30. The electronic device 30 has a power source circuit (not shown) for controlling the DC power supplied by the adapter 40. An output of the power source circuit may charge the battery module 10 and supply the electrical power to the electronic device 30. Moreover, when the adapter 40 does not supply the electrical power the battery module 10 may supply the required electrical power to the electronic device 30.

The battery module 10 comprises at least one battery 11. Each battery 11 may be a battery chargeable lithium cell. The battery module 10 further includes a current detecting circuit 12 for detecting a current of the battery 11 when the battery 11 is in a battery charging mode and a battery discharging mode. The battery module 10 also includes a control circuit 13 for monitoring and controlling the battery charging mode and the battery discharging mode of the battery 11. The battery module also includes a switch element 14, a communication circuit 15, and a temperature detector 16. The switch element 14, which is controlled by the control circuit 13, is configured to be switched on or off in response to commands of the control circuit 13. The communication circuit 15 is for communicating with the electronic device 30. The temperature detector 16 is for sensing a temperature of the battery 11.

The control circuit 13 is configured to receive a battery voltage from the battery 11, an output signal from the current detecting circuit 12, and an output signal from the temperature detector 16. The control circuit 13 is configured to record a present remaining capacity (RC) and a full charge capacity (FCC), and a design capacity (DC) of the battery 11 for further computation. The control circuit 13 controls the on/off of the switch element 14 according to the computation. The control circuit 13 is configured to compute parameters of the battery 11 including a remaining state of capacity (RSOC) of the battery 11, which is the RC divided by the FCC, and a state of health (SOH) of the battery 11, which is the FCC divided by the DC. Please note that the control circuit 13 may include a memory element (not shown) for storing any values of the parameters. The technical features and implementations of the memory element associated with the control circuit 13 are well known by people skilled in the art, and, therefore, no further detailed description is included hereinafter.

Moreover, the control circuit 13 may detect whether the battery 11 has been fully charged before controlling the switch element 14. In addition, while the control circuit 13 detects that any anomaly in the current, the temperature, or the voltage associated with the battery 11, the control circuit 13 may cut off the switch element 14 to protect the battery 11.

The switch element 14 may be a field-effect transistor (FET) with a body diode. The body diode of the switch element 14 may enable a reversed current to pass through the switch element 14 when the switch element 14 is not turned on. The aforementioned switch element 14 includes a discharging switch 14A and a charging switch 14B in a serial connection with the discharging switch 14A. The discharging switch 14A and the charging switch 14B are for blocking a discharging current and a charging current of the battery 11, respectively.

As the voltage of the battery 11 in the discharging reaches a minimum voltage, the control circuit 13 switches off the discharging switch 14A so as to block the discharging current of the battery 11. Meanwhile, the discharging switch 14A that is not turned on may cause the charging current to flow through the body diode. As such, as the charging current passes through and the voltage of the battery 11 increases, the discharging switch 14A may be switched on for current discharging.

Furthermore, when the electronic device 30 receives the DC power through the adapter 40, the control circuit 13 may receive signals from the communication circuit 15 indicative of that the electronic device 30 may charge the battery module 10. The control circuit 13 may then turn on the charging switch 14B according to the signals received, so that the battery 11 is charged by a constant current and then by a constant voltage.

Figure 3:
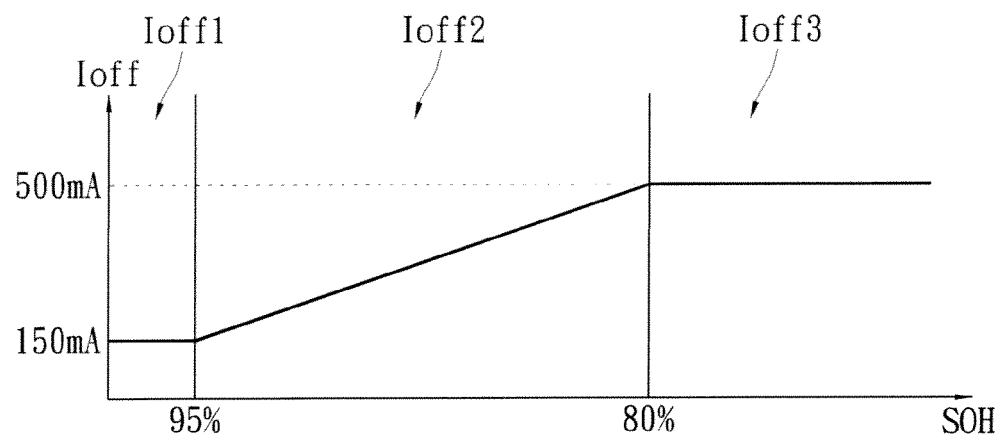
FIG. 3 illustrates a relationship diagram of an embodiment in accordance with the charge-off current and the state of health of a battery according to the present invention.

In conjunction with FIG. 2, FIG. 3 is a relationship diagram of an embodiment in accordance with the charge-off current and the SOC of the battery according to the present invention. When the control circuit 13 receives the signals from the communication circuit 15 indicating that the electronic device 30 may charge the battery module 10, the control circuit 13 may determine a charge-off current Ioff, which is utilized for the battery charging of the battery 11.

The present invention method may include the steps: the control circuit 13 reads an actual capacity parameter of the battery. In one implementation, the actual capacity parameter is the FCC of the battery. In another implementation, the actual capacity parameter is the SOH of the battery. In the embodiment, the SOH serves as an exemplary actual capacity parameter of the battery.

The control circuit reads a default regulation including a plurality of battery capacity regions. In one implementation, the default regulation may include a first battery capacity region, a second battery capacity region, and a third battery capacity region. It is worth noting that the first, the second and the third battery capacity regions are different to each other and could be represented in terms of the SOH. For example, the first battery capacity region may represent the SOH ranging from 95% to 100%. The second battery capacity region may represent the SOH ranging from 80% to 95%. The third battery capacity region may represent the SOH that is lower than 80%.

The control circuit 13 identifies the battery capacity region within which the actual capacity parameter of the battery falls. While the control circuit 13 determines the actual capacity parameter of the battery 11 is within the first battery capacity region, the control circuit 13 may charge the battery 11 according to a first charge-off current Ioff1 corresponding to the first battery capacity region. Additionally, while the control circuit 13 determines the actual capacity parameter of the battery 11 is within the second battery capacity region, the control circuit 13 may charge the battery 11 according to a second charge-off current Ioff2 corresponding to the second battery capacity region. Moreover, while the control circuit 13 determines the actual capacity parameter of the battery 11 is within the third battery capacity region, the control circuit 13 may charge the battery 11 according to a third charge-off current Ioff3 corresponding to the third battery capacity region.

In one implementation, the first charge-off current Ioff1 is smaller than the second charge-off current Ioff2, which is smaller than the third charge-off current Ioff3. The first charge-off current Ioff1 and the third charge-off current Ioff3 could be predetermined in their values while the second charge-off current Ioff2 may vary and is proportional to the actual capacity parameter of the battery 11.

As such, the battery charging method of the present invention increases the charge-off current toff in response to the decline in the RSOC of the battery for extending the life of the battery.

Figure 4:
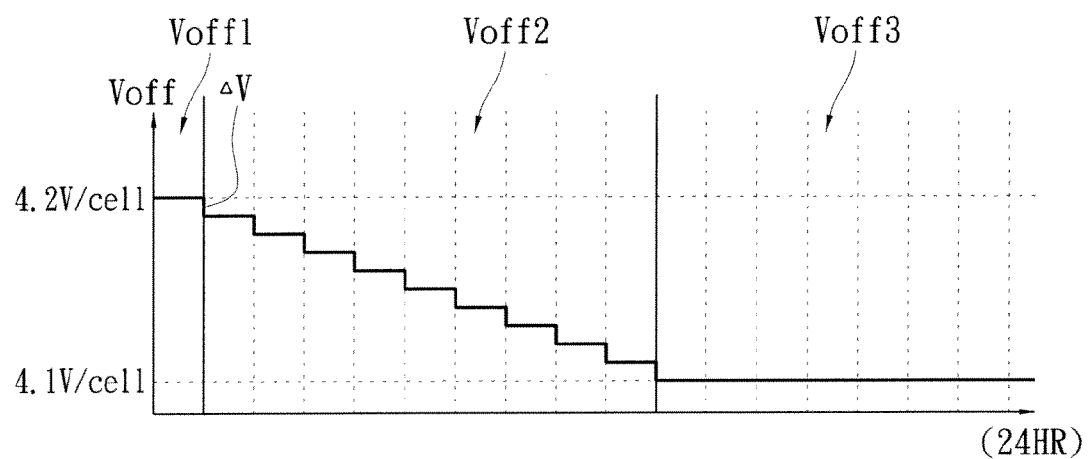
FIG. 4 provides a relationship diagram of an embodiment in accordance with the charge-off voltage of the battery and the battery idle time according to the present invention.

In conjunction with FIG. 2, FIG. 4 is a relationship diagram of the embodiment in accordance with the charge-off voltage of the battery and the battery idle time according to the present invention. The present invention battery charging method further includes modulating the charge-off voltage Voff with respect to a battery idle time. In the embodiment, the control circuit 13 determines a voltage level of the charge-off voltage Voff, which is utilized for the battery charging of the battery 11.

For modulating the charge-off voltage with respect to the battery idle time, the present invention method may include steps of causing the control circuit 13 to record an actual battery idle time of the battery 1, and causing the control circuit 13 to read a default regulation including a plurality of battery idle periods. In one implementation, the default regulation may include a first battery idle period, a second battery idle period, and a third battery idle period. The first, the second, and the third idle periods are different to each other.

The method according to one embodiment of the present invention further includes a step of causing the control circuit 13 to identify the battery idle period within which the actual idle time of the battery falls. While the control circuit 13 determines the actual idle time of the battery 11 is within the first idle period, the control circuit 13 may charge the battery 11 according to a first charge-off voltage Voff1 associated with the first idle period. Additionally, while the control circuit 13 determines the actual idle time of the battery 11 is within the second idle period, the control circuit 13 may charge the battery 11 according to a second charge-off voltage Voff2 associated with the second idle period. Moreover, while the control circuit 13 determines the actual idle time of the battery 11 is within the third idle period, the control circuit 13 may charge the battery 11 according to a third charge-off voltage Voff3 associated with the third idle period.

In one implementation, the first charge-off voltage Voff1 is larger than the second charge-off voltage Voff2, which is larger than the third charge-off voltage Voff3. It is worth noting that the first charge-off voltage Voff1 and the third charge-off voltage Voff3 may be of respective predetermined values while the second charge-off voltage Voff2 may vary and is proportional to the actual idle time of the battery 11.

When the control circuit 13 determines that the idle time of the battery 11 exceeds 24 hours, the charge-off voltage Voff level may be decreased by a predetermined voltage variation level of $\Delta V$, such as 10 mV/cell, from the default setting of 4.2V/cell changes to 4.19V/cell. The control circuit 13 records the present charge-off voltage Voff of 4.19V/cell. Subsequently, while the control circuit 13 determines that the idle time of the battery 11 exceeds 24 hours again, the charge-off voltage Voff is further decreased by the predetermined voltage variation level $\Delta V$ of 10 mV/cell, so that the charge-off voltage Voff may become 4.18V/cell. If the charge-off voltage Voff has been reduced to 4.1V/cell and the battery 11 still remains unused, the control circuit 13 may reset the charge-off voltage Voff to 4.2V/cell directly before further determining whether the idle time of the battery 11 continues to accumulate.

To be more specific, the battery charging method according to the present embodiment may modulate the value of the charge-off voltage Voff based on the idle time of the battery 11 (e.g., 24 hours) and limit the value of the charge-off voltage Voff between 4.2V/cell and 4.1V/cell. As such, while the control circuit 13 receives the signals from the communication circuit 15 indicative of that the electronic device 30 may charge the battery module 10, the control circuit 13 may utilize the updated charge-off voltage Voff as a cut-off point where the battery 11 may be charged by the constant voltage rather than the constant current.

Figure 5:
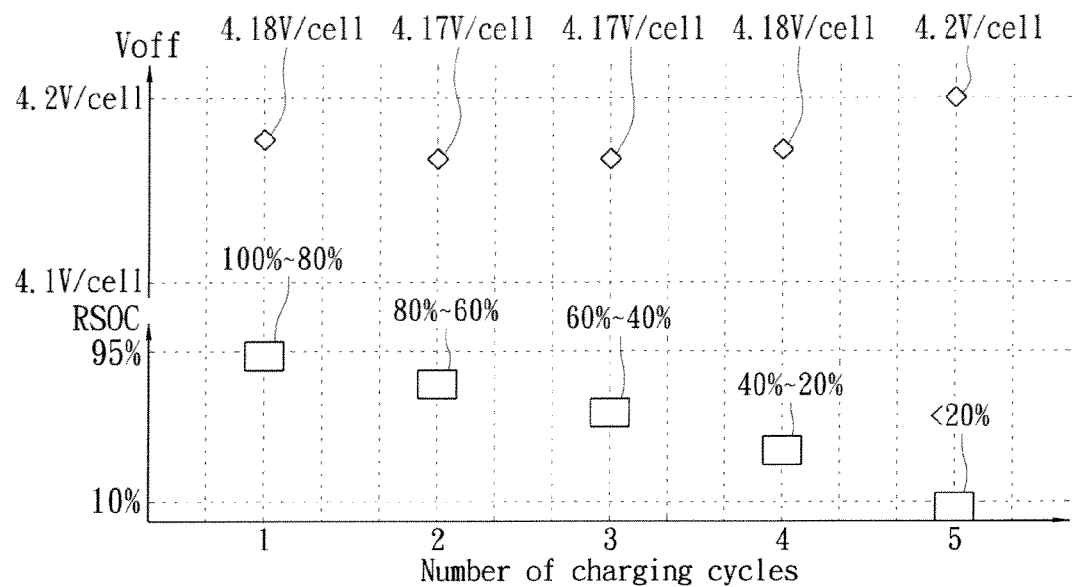
FIG. 5 provides a relationship diagram of an embodiment in accordance with the charge-off voltage of the battery and a battery's remaining capacity according to the present invention.

In conjunction with FIG. 2, FIG. 5 is a relationship diagram of the embodiment in accordance with the charge-off voltage of the battery and a battery remaining capacity according to the present invention. The present invention further provides another charging method applicable when the idle time of the battery 11 does not exceed the default time (e.g., 24 hours). Please note that even though when the parameter of the default time is not set the charging method could still be implemented when a remaining capacity parameter of the battery 11 falls within a battery remaining capacity region. The charging method may adjust or maintain the charge-off voltage Voff of the battery 11 with respect to the battery remaining capacity.

The control circuit 13 is configured to determine a voltage level of the charge-off voltage Voff so that the battery charging for the battery 11 may proceed on basis of the charge-off voltage Voff on the battery 11.

The method of the embodiment includes the steps: the control circuit 13 records a remaining capacity parameter of the battery 11 such as the RC and the RSOC. The control circuit 13 further reads a default regulation, which defines a plurality of battery remaining capacity regions. The battery remaining capacity regions include a first remaining capacity region, a second remaining capacity region, and a third battery remaining capacity region. The above-mentioned first, second, and third remaining capacity regions are not identical, and each of the remaining capacity regions is associated with its respective charge-off voltage.

The control circuit 13 identifies the remaining capacity region within which the battery remaining capacity parameter falls. When the control circuit 13 determines the battery remaining capacity parameter is within the first remaining capacity region, the control circuit 13 may charge the battery 11 according to a first charge-off voltage Voff1. Additionally, while the control circuit 13 determines the battery remaining capacity parameter is within the second remaining capacity region, the control circuit 13 may charge the battery 11 according to a second charge-off voltage Voff2. Moreover, while the control circuit 13 determines the battery remaining capacity parameter is within the third remaining capacity region, the control circuit 13 may charge the battery 11 according to a third charge-off voltage Voff3. It is worth noting that at least two of the first charge-off voltage, the second charge-off voltage, and the third charge-off voltage are different.

Please refer to FIG. 2 and FIG. 5 again. In the embodiment, the first remaining capacity region represents the RSOC ranging from 100% to 80%. The third remaining capacity region represents the RSOC less than 20%. And the second remaining capacity region may include the RSOC ranging from 80%~60%, 60%~40%, and 40%~20%.

Furthermore, the aforementioned five different ranges of the RSOC are associated with their corresponding correction voltages, respectively. For example, the RSOC ranging between 100% and 80% corresponds to a correction voltage of −20 mV/cell. The RSOC ranging between 80% and 60% corresponds to a correction voltage of −10 mV/cell. The RSOC ranging between 60% and 40% corresponds to a correction voltage of 0 mV/cell. The RSOC ranging between 40% and 20% corresponds to a correction voltage of +10 mV/cell. And the RSOC less than 20% corresponds to no correction voltage, which means the charge-off voltage Voff is fixed at 4.2V/cell.

In the embodiment, when the control circuit 13 receives the signals from the communication circuit 15 indicating that the electronic device 30 may charge the battery module 10, the control circuit 13 identifies the ranges within which the RSOC falls. The control circuit 13 may update but not necessarily adjust the voltage level of the charge-off voltage Voff according to the corresponding correction voltage associated with the range within which the RSOC falls. Thus, such updated charge-off voltage could serve as the basis for the battery charging operating in the constant voltage battery charging mode when switching from operating in the constant current battery charging mode.

Again, refer to FIG. 5, when the RSOC associated with the battery 11 is within the range between 100% and 80%, the charge-off voltage Voff is reduced by the correction voltage of 20 mV/cell (i.e., from 4.2V/cell to 4.18V/cell) and the updated charge-off voltage (i.e., 4.18V/cell) is recorded. Then, when the RSOC is in the range of 80%~60%, the charge-off voltage Voff is reduced by the correction voltage of 10 mV/cell, which is from 4.18V/cell to 4.17V/cell, and the updated is recorded also. Next, while the RSOC is in the range of 60%~40%, the charge-off voltage Voff remains unchanged as 4.17V/cell before being recorded. Next, when the RSOC is in the range of 40%~20%, the charge-off voltage Voff increases by the correction voltage of 10 mV/cell (i.e., from 4.17V/cell to 4.18V/cell) before the updated is stored. When the RSOC falls within the range below 20%, the charge-off voltage Voff may increases from 4.18V/cell to 4.2V/cell before being recorded.

Figure 6:
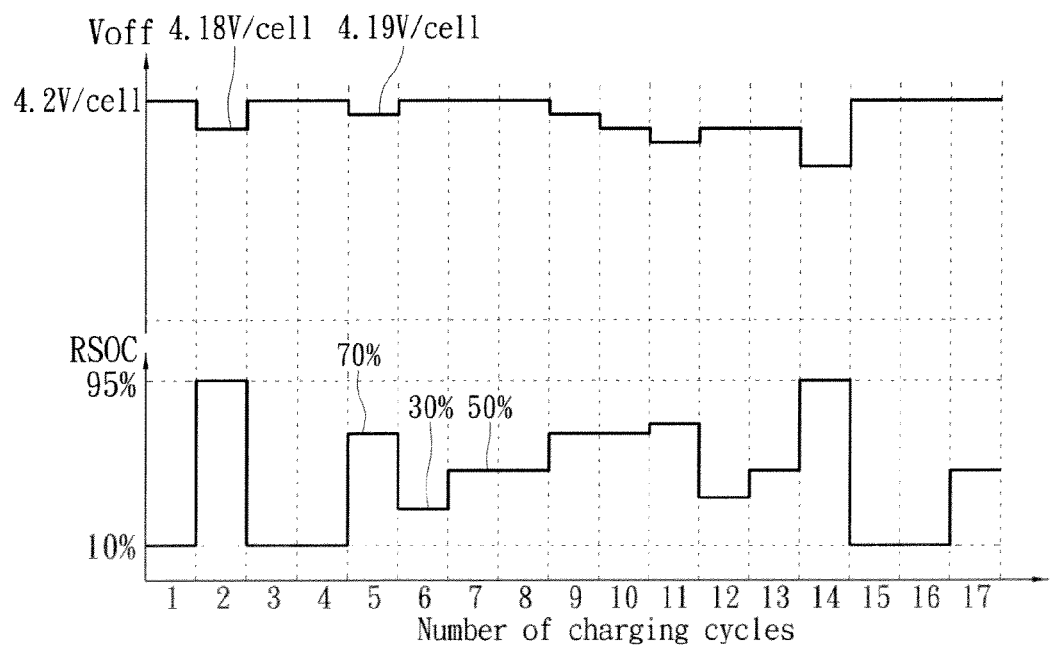
FIG. 6 illustrates an application relationship diagram of the embodiment in accordance with the charge-off voltage of the battery and the battery remaining capacity according to the present invention.

Please refer to FIG. 6, in which an application relationship diagram of the embodiment in accordance with the charge-off voltage of the battery and the battery remaining capacity according to the present invention is demonstrated. For one battery charging for the battery 11 at the time when the RSOC of the battery 11 is 10%, the charge-off voltage Voff initially is set to 4.2V/cell before being recorded. When the RSOC of the battery 11 is 95% as the result of the battery charging, the charge-off voltage Voff is reduced by 20 mV/cell from the recorded 4.2V/cell to 4.18V/cell before the value of 4.18V/cell is recorded. Thereafter, when the RSOC of the battery 11 falls to 10% again as the result of the usage of the battery 11, the charge-off voltage Voff increases from 4.18V/cell to 4.2V/cell before the value of 4.2V/cell is recorded. When the RSOC climbs to 70% because of another round of the battery charging, the charge-off voltage Voff may decrease by 10 mV/cell from 4.2V/cell to 4.19V/cell before the value of 4.19V/cell is recorded. When the RSOC of the battery 11 falls to 30%, the charge-off voltage Vaf may then increase by 10 mV/cell from 4.19V/cell to 4.2V/cell before the value of 4.2V/cell is recorded. Thereafter, when the RSOC of the battery 11 climbs to 50% in the next battery charging, the charge-off voltage Voff maintains at 4.2V/cell before the value of 4.2V/cell is recorded.

Figure 7:
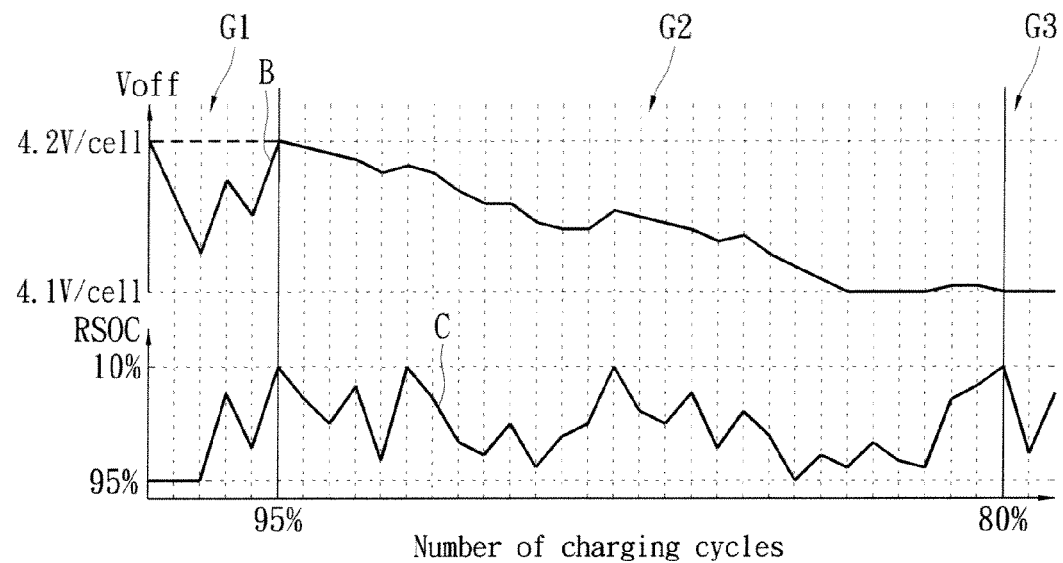
FIG. 7 illustrates a relationship diagram of the embodiment in accordance with the charge-off voltage of the battery, the battery remaining capacity, and the battery idle time according to the present invention.

In conjunction with FIG. 2, please refer to FIG. 7, in which a relationship diagram of the embodiment in accordance with the charge-off voltage of the battery, the battery remaining capacity, and the battery idle time according to the present invention is demonstrated.

When the control circuit 13 receives the signals from the communication circuit 15 indicating that the electronic device 30 may charge the battery module 10, the control circuit 13 identifies the RSOC and the idle time of the battery 11 and sets and records the voltage level of the charge-off voltage Voff according to the result of the identification. And the recorded charge-off voltage may serve as the basis for battery charging in the constant voltage battery charging mode after the battery charging switching from the constant current battery charging mode.

In the embodiment, the control circuit 13 determines the voltage level of the charge-off voltage Voff on which the battery charging is based. The method of the embodiment includes the steps: the control circuit 13 reads a battery state parameter. In one implementation, the battery state parameter is the actual idle time. In another implementation, the battery state parameter is the RC.

The control circuit 13 reads a default regulation, which defines a plurality of battery state regions. The battery state regions refer to a plurality of the actual idle periods and/or a plurality of the RCs. The battery state regions include a first battery state region G1, a second battery state region G2, and a third battery state region G3, wherein G1, G2, and G3 are not identical.

The control circuit 13 identifies which battery state regions within which the battery state parameter falls. Once the control circuit 13 determines the battery state parameter is within the first battery state region G1, the control circuit 13 may charge the battery 11 according to the first charge-off voltage Voff1. Additionally, while the control circuit 13 determines the battery state parameter is within the second battery state region G2, the control circuit 13 may charge the battery 11 according to the second charge-off voltage Voff2. Moreover, while the control circuit 13 determines the battery state parameter is within the third battery state region G3, the control circuit 13 may charge the battery 11 according to the third charge-off voltage Voff3.

As shown in FIG. 7, the curve B represents the charge-off voltage of the battery 11, and the curve C represents the value of the RSOC. The charge-off voltage Voff may be adjusted by a predetermined voltage variation level ΔV on basis of the actual idle time of the battery 11 before being recorded. For example, when the actual idle time exceeds the default time such as 24 hours the voltage variation level charge-off voltage ΔV may be lowered. It is worth noting that the charge-off voltage of the battery 11 is set between 4.1V/cell and 4.2V/cell. In addition, when the actual idle time of the battery 11 does not exceed the default time (e.g. 24 hours), the charge-off voltage Voff may be adjusted or maintained with respect to the RC of the battery 11.

Hence, the battery charging method according to the present embodiment is capable of dynamically adjusting the charge-off voltage with respect to the variation of both the actual idle time and the RC. The charge-off voltage is not at a fixed value and may vary with respect to the present state of the battery 11, thereby increasing charging/discharging efficiency of the battery 11. Meanwhile, the present invention provides a self-learning battery charging method, which records frequent usage of the battery 11 in order to upwardly or downwardly adjust the charge-off voltage, thereby extending the life of the battery 11. Moreover, the method disclosed in the present embodiment may module the charge-off current according to the SOH when the voltage level of the charge-off voltage has been determined and the battery 11 has been charged to that particular voltage level.

Figure 8:
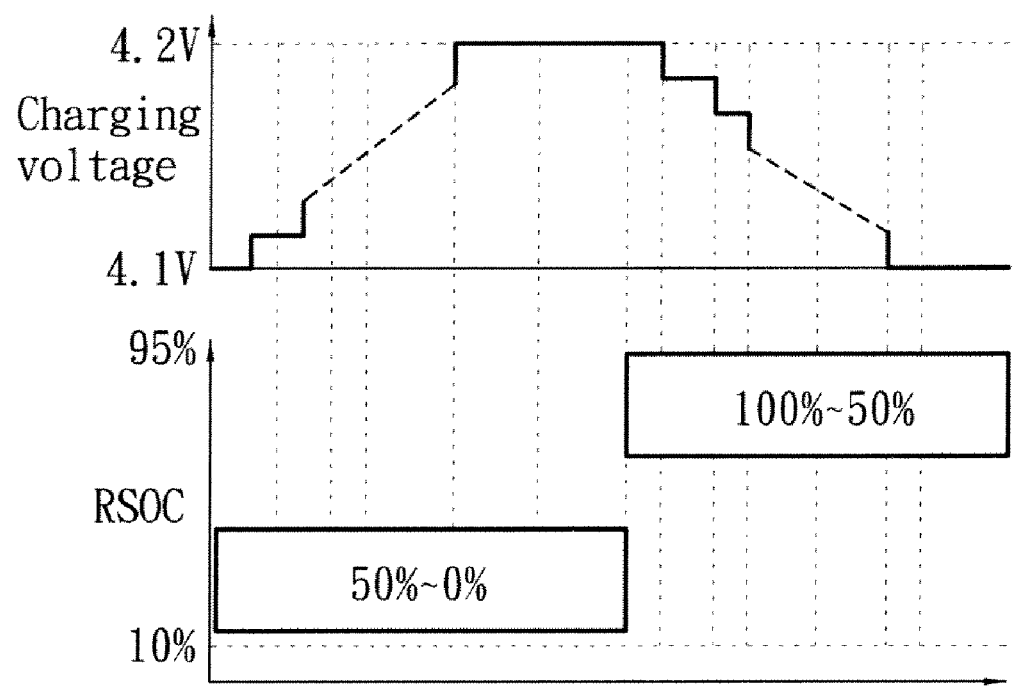
FIG. 8 illustrates a schematic diagram of the embodiment by applying two battery remaining capacity regions so as to adjust the charge-off voltage of the battery according to the present invention.

Though in the aforementioned embodiments, three battery capacity regions, three battery actual idle times, and three remaining capacity regions are utilized for illustration the embodiments of the present invention may adopt two battery capacity regions to adjust the charge-off current, and two battery actual idle periods and/or two battery remaining capacity regions to adjust the charge-off voltage. As shown in FIG. 8, two battery remaining capacity regions are utilized to adjust the charge-off voltage of the battery according to the present invention. When the RSOC is in the range of 100% to 50%, the charge-off voltage may gradually reduce rom 4.2 V to 4.1 V with respect to the decline in the RSOC. When the RSOC is in the range of 50% to 0%, the charge-off voltage may gradually climb from 4.1 V to 4.2V with respect to the decline in of the RSOC.

The aforementioned descriptions represent at least one embodiments of the present invention, without intention to limit the scope of the present invention thereto. Various equivalent changes, alterations, or modifications based on the claims of present invention are all consequently viewed as being embraced by the scope of the present invention.

What is claimed is:

1. A battery charging method, implemented by a control circuit so as to charge a battery according to a charge-off current, comprising:
   reading an actual capacity parameter of the battery, wherein the actual capacity parameter of the battery represents a full charge capacity of the battery or a percentage representative of the full charge capacity of the battery divided by a design capacity of the battery;
   reading a default regulation defining a plurality of battery capacity regions including a first battery capacity region and a second battery capacity region;
   determining whether the actual capacity parameter of the battery is in the first battery capacity region or the second battery capacity region; charging the battery according to a first charge-off current when determining the actual capacity parameter of the battery is within the first battery capacity region; and
   charging the battery according to a second charge-off current when determining the actual capacity parameter of the battery is within the second battery capacity region;
   wherein the first battery capacity region and the second battery capacity region are different, and the first charge-off current is smaller than the second charge-off current.

2. The battery charging method according to claim 1, further comprising when the plurality of battery capacity regions further includes a third battery capacity region:
   determining whether the actual capacity parameter of the battery is in the third battery capacity region; and
   charging the battery according to a third charge-off current when determining the actual capacity parameter of the battery is within the third battery capacity region;
   wherein the first battery capacity region, the second battery capacity region, and the third battery capacity region are not identical, and the first charge-off current is smaller than the second charge-off current, which is smaller than the third charge-off current.

3. A battery charging method, implemented by a control circuit so as to charge a battery according to a charge-off voltage, comprising:
   recording a actual idle time of the battery;
   reading a default regulation defining a plurality of battery idle periods including a first battery idle period and a second battery idle period;
   determining whether the actual idle time is in the first battery idle period or the second battery idle period;
   charging the battery according to a first charge-off voltage when determining the actual idle time is within the first battery idle period; and
   charging the battery according to a second charge-off voltage when determining the actual idle time is within the second battery idle period;
   wherein the first battery idle period and the second battery idle period are different, and the first charge-off voltage is larger than the second charge-off voltage.

4. The battery charging method according to claim 3, wherein the first charge-off voltage is fixed at a predetermined voltage level while the second charge-off voltage varies.

5. The battery charging method according to claim 3, when the plurality of battery idle periods further includes a third battery idle period further comprising:
   determining whether the actual idle time is in the third battery idle period; and
   charging the battery according to a third charge-off voltage when determining the actual idle time is within the third battery idle period;
   wherein the first battery idle period, the second battery idle period, and the third battery idle period are different, and the first charge-off voltage is larger than the second charge-off voltage, which is larger than the third charge-off voltage.

6. The battery charging method according to claim 3, further comprising:
   reading a remaining capacity parameter of the battery, wherein the remaining capacity parameter of the battery represents a remaining capacity of the battery or a percentage representative of the remaining capacity of the battery divided by a full charge capacity of the battery and the default regulation further defines a plurality of remaining capacity regions of the battery including a first remaining capacity region and a second remaining capacity region;
   determining whether the remaining capacity parameter of the battery is in the first remaining capacity region or the second remaining capacity region;
   charging the battery in response to a first charge-off voltage when determining the remaining capacity parameter of the battery is within the first remaining capacity region; and
   charging the battery according to a second charge-off voltage when determining the remaining capacity parameter of the battery is within the second remaining capacity region;
   wherein the first remaining capacity region and the second remaining capacity region are different, and the first charge-off voltage is different to the second charge-off voltage.

7. A battery charging method, implemented by a control circuit so as to charge a battery according to a charge-off voltage, comprising:
   reading a remaining capacity parameter of the battery, wherein the remaining capacity parameter of the battery represents a remaining capacity of the battery or a percentage representative of the remaining capacity of the battery divided by a full charge capacity of the battery;
   reading a default regulation defining a plurality of remaining capacity regions of the battery including a first remaining capacity region and a second remaining capacity region;
   determining whether the remaining capacity parameter of the battery is in the first remaining capacity region or the second remaining capacity region;
   charging the battery in response to a first charge-off voltage when determining the remaining capacity parameter of the battery is within the first remaining capacity region; and charging the battery according to a second charge-off voltage when determining the remaining capacity parameter of the battery is within the second remaining capacity region;

wherein the first remaining capacity region and the second remaining capacity region are different, and the first charge-off voltage is different to the second charge-off voltage.

8. The battery charging method according to claim 7, when the plurality of remaining capacity regions of the battery further includes a third remaining capacity region further comprising:

determining whether the remaining capacity parameter of the battery is in the third remaining capacity region; and charging the battery according to a third charge-off voltage when determining the remaining capacity parameter of the battery is within the third remaining capacity region;

wherein the first remaining capacity region, the second remaining capacity region, and the third remaining capacity region are different, and at least two of the first charge-off voltage, the second charge-off voltage, and the third charge-off voltage are different.

* * * * *